(12) United States Patent
Mathuriya et al.

(10) Patent No.: US 10,884,957 B2
(45) Date of Patent: Jan. 5, 2021

(54) PIPELINE CIRCUIT ARCHITECTURE TO PROVIDE IN-MEMORY COMPUTATION FUNCTIONALITY

(71) Applicant: Intel Corporation, Santa Clara, CA (US)

(72) Inventors: Amrita Mathuriya, Portland, OR (US); Sasikanth Manipatruni, Portland, OR (US); Victor W. Lee, Santa Clara, CA (US); Abhishek Sharma, Hillsboro, OR (US); Huseyin E. Sumbul, Portland, OR (US); Gregory Chen, Portland, OR (US); Raghavan Kumar, Hillsboro, OR (US); Phil Knag, Hillsboro, OR (US); Ram Krishnamurthy, Portland, OR (US); Ian Young, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 89 days.

(21) Appl. No.: 16/160,952

(22) Filed: Oct. 15, 2018

(65) Prior Publication Data

US 2019/0057050 A1 Feb. 21, 2019

(51) Int. Cl.
G06F 13/16 (2006.01)
G06F 13/28 (2006.01)
G06N 20/00 (2019.01)

(52) U.S. Cl.
CPC .......... *G06F 13/1668* (2013.01); *G06F 13/28* (2013.01); *G06N 20/00* (2019.01)

(58) Field of Classification Search
CPC ...... G06F 13/1668; G06F 13/28; G06N 20/00
See application file for complete search history.

(56) References Cited

U.S. PATENT DOCUMENTS

| | | | |
|---|---|---|---|
| 6,505,305 B1 * | 1/2003 | Olarig | G11C 29/76 714/5.11 |
| 7,266,757 B1 * | 9/2007 | Mazahreh | H03M 13/2957 714/774 |
| 8,073,892 B2 * | 12/2011 | Feghali | G06F 7/5275 708/603 |

(Continued)

*Primary Examiner* — Tim T Vo
*Assistant Examiner* — Herve Iradukunda
(74) *Attorney, Agent, or Firm* — Green, Howard & Mughal LLP

(57) ABSTRACT

Techniques and mechanisms for performing in-memory computations with circuitry having a pipeline architecture. In an embodiment, various stages of a pipeline each include a respective input interface and a respective output interface, distinct from said input interface, to couple to different respective circuitry. These stages each further include a respective array of memory cells and circuitry to perform operations based on data stored by said array. A result of one such in-memory computation may be communicated from one pipeline stage to a respective next pipeline stage for use in further in-memory computations. Control circuitry, interconnect circuitry, configuration circuitry or other logic of the pipeline precludes operation of the pipeline as a monolithic, general-purpose memory device. In other embodiments, stages of the pipeline each provide a different respective layer of a neural network.

23 Claims, 12 Drawing Sheets

(56) References Cited

U.S. PATENT DOCUMENTS

2007/0245131 A1\* 10/2007 Yoshikawa ......... G06F 15/7867
 712/220
2009/0300287 A1\* 12/2009 Ishimura ............. G06F 12/0888
 711/118

\* cited by examiner

PIPELINE CIRCUIT ARCHITECTURE TO PROVIDE IN-MEMORY COMPUTATION FUNCTIONALITY

BACKGROUND

1. Technical Field

Embodiments of the invention generally relate to operation of a memory device and more particularly, but not exclusively, to circuit structures for implementing an in-memory computation.

2. Background Art

In modern image, speech, and pattern recognition operations, comparing, matching, multiplying and other processing of sample data is often required. Machine learning algorithms are used in various applications such as embedded-sensor networks and computer vision. The operation of pattern recognition can be used for classification in machine learning. Pattern recognition is also used for multimedia applications such as object detection or speech recognition. Computation in pattern recognition is one type of repetitive process which has traditionally required regular memory accesses, and as such, has consumed significant energy.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1A:
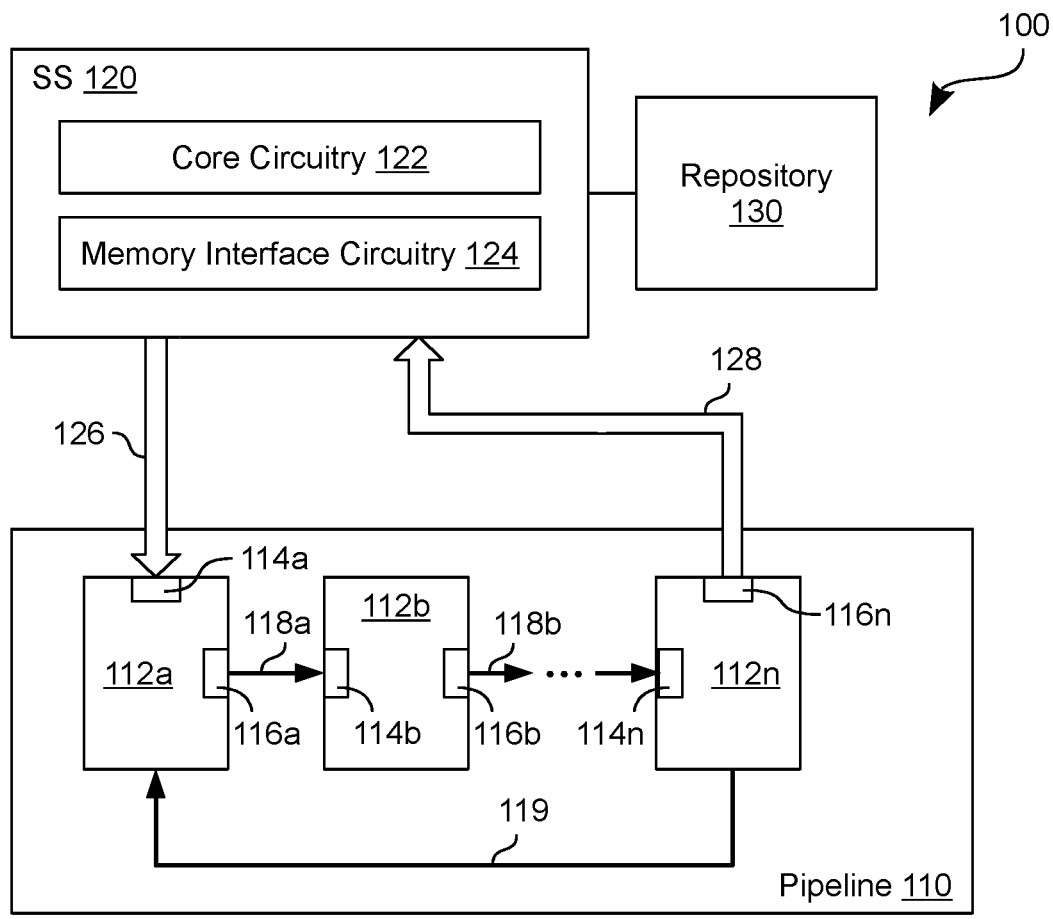
FIG. 1A is a functional block diagram illustrating elements of a system including a pipeline circuit architecture according to an embodiment.

Embodiments discussed herein variously provide techniques and mechanisms for performing in-memory computations each at a different respective stage of circuitry having a pipelined, multi-stage architecture. As used herein in the context of "in-memory computing," "in-memory compute operation," "in-memory data computation" and related phrases, the term "in-memory" refers to the characteristic of an action being performed locally at a memory device which includes both a memory array and interface logic by which the memory device is to couple (indirectly or indirectly) to some memory controller, processor or other external host agent. In some embodiments, a given stage is a memory device which includes an array of memory cells (or "memory array") and circuitry, coupled thereto, which is operable to detect a logic state based on one or more bits currently stored by the array. Such circuitry performs one or more data computations based on the logic state and, for example, provides a computation result as data to be stored back to the first array.

In some embodiments, a pipeline comprises an in-series arrangement of stages, some or all of which variously provide respective in-memory computation functionality. Functionality of the pipeline is application specific in one or more respects—e.g., at least insofar as the pipeline comprises interconnect circuitry, control circuitry, configuration circuitry and/or other circuit logic which precludes operation of the pipeline as a monolithic general-purpose memory device. By way of illustration and not limitation, one or more pipeline stages may be "hidden" stages, wherein the memory array of a hidden stage is accessible to a memory controller (or other host logic external to the pipeline) only via one or more other stages of the pipeline. Alternatively or in addition, circuitry of the pipeline might dedicate different regions of a memory array in a given pipeline stage (and/or regions of memory arrays in different respective pipeline stages) to storing different types of data. Alternatively or in addition, control circuitry of the pipeline might be configured to automatically perform multiple memory array accesses and/or other operations according to any of one or more predefined sequences. Furthermore, stages of a pipeline may additionally or alternatively be configured to communicate with one another automatically—e.g., independent of any explicit commands from a memory controller which specify said communication. By providing a specialized pipeline to perform multiple in-memory computations each at a respective pipeline stage, some embodiments variously enable power and/or time efficient calculations to provide functionality of a neural network (for example).

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a pipelined arrangement of stages which variously provide in-memory computation functionality.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

It is pointed out that those elements of the figures having the same reference numbers (or names) as the elements of any other figure can operate or function in any manner similar to that described, but are not limited to such.

FIG. 1A shows features of a system 100 to perform in-memory compute operations according to an embodiment. System 100 is one example of an embodiment wherein circuitry provides a pipeline architecture, two or more stages of which each include a respective memory array and circuitry, coupled thereto, to perform in-memory computation based on data which is stored at said memory array. Such stages are coupled to one another in an in-series pipeline configuration which, for example, enables functionality of a neural network.

As shown in FIG. 1A, system 100 includes a pipeline 110 and source and/or sink circuitry SS 120, coupled thereto, to operate as a source of data provided to pipeline 110, or as a sink to receive data from pipeline 110. SS 120 comprises circuitry to control operation of pipeline 110—e.g., where SS 120 includes some or all circuitry of a multi-core (or single core) processor, such as one including the illustrative core circuitry 122 shown. Core circuitry 122 comprises any of a variety of suitable circuit blocks that, for example, are adapted from conventional processor core architectures. Examples of such circuit blocks include, but are not limited to, an arithmetic-logic unit (ALU), register file, scheduler, instruction fetch, instruction decoder, branch prediction unit, instruction translation lookaside buffer (TLB), instruction cache memory, data cache memory, and/or the like.

In the example shown, SS 120 further comprises memory interface circuitry 124 to provide access to pipeline 110 for core circuitry 122. A core comprising core circuitry 122 is configured to execute a general-purpose operating system and/or other software for a computer platform that includes system 100. Memory interface circuitry 124 comprises interconnects and/or memory controller logic coupled to facilitate access to pipeline 110 by core circuitry 122. For example, in some embodiments, one core of a processor comprises each of core circuitry 122, memory interface circuitry 124 and pipeline 110—e.g., wherein memory interface circuitry 124 also provides an interface to, and/or control of, one or more cache memories of the processor core. Alternatively, pipeline 110 may be distinct from any processor core of SS 120 and, in some embodiments, distinct from any processor which includes SS 120. For example, in other embodiments, one core of a processor (the core comprising core circuitry 122) is coupled to memory interface circuitry 124—e.g., wherein memory interface circuitry 124 is an integrated memory controller of the processor. In still another embodiment, memory interface circuitry 124 and pipeline 110 are each distinct from, but communicatively coupled to, a processor which comprises core circuitry 122.

In one embodiment, pipeline 110 is circuitry of an integrated circuit (IC) die other than any IC die of SS 120. For example, pipeline 110 may be a packaged device other than any packaged device of SS 120. In another embodiment, system 100 is a system-on-chip (SoC) device. Although some embodiments are not limited in this regard, system 100 may further comprise or couple to one or more other resources (such as the illustrative repository 130 shown) which, for example, facilitate relatively long-term data storage. By way of illustration and not limitation, repository 130 includes a solid-state drive (SSD), hard disk drive (HDD) or the like. Alternatively or in addition, memory resources of repository 130 may function as one or more memory caches which are included in (or coupled to) SS 120.

SS 120 is coupled to pipeline 110 via one or more interconnects, such as the illustrative interconnects 126, 128 shown. Pipeline 110 comprises a plurality of stages (e.g., including the illustrative stages 112a, 112b, . . . , 112n) which are coupled to communicate each with a respective one or more other stages of pipeline 110. In an example embodiment, an in-series stage arrangement of pipeline 110 is provided with interconnects—e.g., including the illustrative interconnects 118a, 118b shown—which are variously coupled each between a respective two of stages 112a, 112b, . . . , 112n. Some or all such stages each include a respective input interface and a respective output interface (e.g., wherein stages 112a, 112b, . . . , 112n include respective input interfaces 114a, 114b, . . . , 114n and respective output interfaces 116a, 116b, . . . , 116n). An input interface of a given pipeline stage receives one or more data signals, command signals, control signals and/or other communication from one of SS 120 or a respective preceding pipeline stage. Similarly, an output interface of a given pipeline stage provides data, command, control and/or other signal communications to one of SS 120 or a respective next pipeline stage.

In the example embodiment shown, interconnect 126 facilitates communication from memory interface circuitry 124 (or other logic of SS 120) to input interface 114a of stage 112a—e.g., where interconnect 128 facilitates communication from output interface 116n of stage 112n to memory interface circuitry 124. In other embodiments, pipeline 110 alternatively comprises a consolidated input/output interface which provides functionality of both input interface 114a and output interface 116n—e.g., wherein a single bus and/or other signal lines provide functionality of both interconnects 126, 128.

Interconnects 126, 128 comprise respective signal lines to variously exchange signaling between SS 120 and pipeline 110. In an example embodiment, one or each of interconnects 126, 128 include a data bus, an address bus, a command bus and/or any of a variety of combinations of some or all such buses in support of SS 120 accessing or otherwise controlling pipeline 110. Interconnect 126 may further include one or more control signal lines for control signaling (e.g., other than command, address and/or data signaling) to pipeline 110. A reader of skill in the art will appreciate that such control signal lines communicate, for example, one or more of a chip select signal, a write enable signal, an output enable signal, a clock signal, a column address strobe signal, a row address strobe signal or any of a variety of other conventional control signals. One or more interconnects between respective stages of pipeline 110 (e.g., one of interconnects 118a, 118b) facilitate similar command, address, data, and/or control communications. As discussed herein, one or more signals lines of a given interconnect indicate (explicitly or implicitly) that one or more in-memory computations are to be performed each at a respective stage of pipeline 110, based on data which is stored at a local array of memory cells.

In some embodiments, integrated circuitry of a processor (and in some embodiments, of an individual processor core) comprises both pipeline 110 and SS 120. For example, interconnects 126, 128 are each further coupled to access one or more cache memories of SS 120—e.g., wherein a cache memory and pipeline 110 are integrated in the same processor core, and where memory interface circuitry 124 provides both memory controller functionality to operate pipeline 110 and cache controller functionality to access the cache memory. In one such embodiment, respective memory arrays of the cache memory of pipeline have the same type of memory cells (e.g., SRAM memory cells), the same sized rows and/or columns of such memory cells, and/or the like.

In various embodiments, interconnect circuitry—e.g., including a portion of interconnect 126 and/or interconnect 128—is coupled between memory interface circuitry 124 and pipeline 110, and also coupled between memory interface circuitry 124 and a cache memory. For example, memory interface circuitry 124 may use a shared bus to various communicate different commands and/or data each with a respective one of pipeline 110 and a cache memory of a processor which includes SS 120. In one example embodiment, such cache memory resides in a processor core which includes core circuitry 122, memory interface circuitry 124 and pipeline 110. In another embodiment, the cache memory is distinct from, but communicatively coupled to, each processor core of a processor—e.g., wherein the cache memory and pipeline 110 are available for shared access by any such processor core.

Figure 1B:
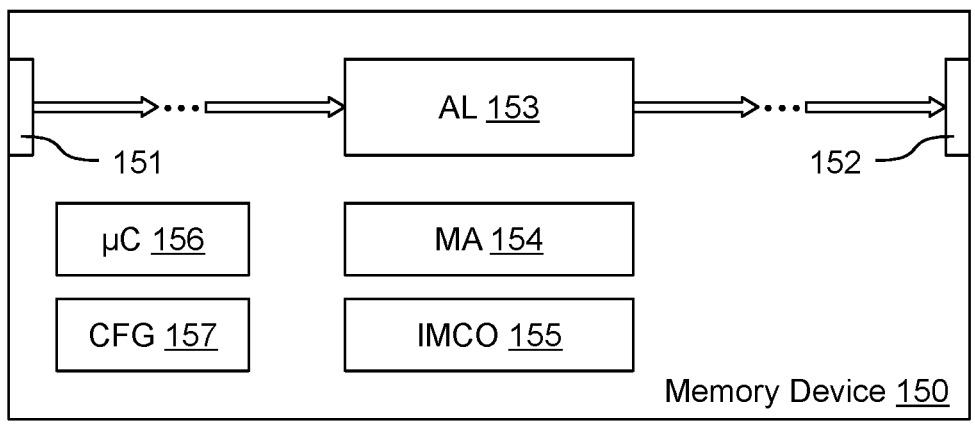
FIG. 1B is a functional block diagram illustrating elements of a memory device to perform an in-memory computation according to an embodiment.
Figure 1C:
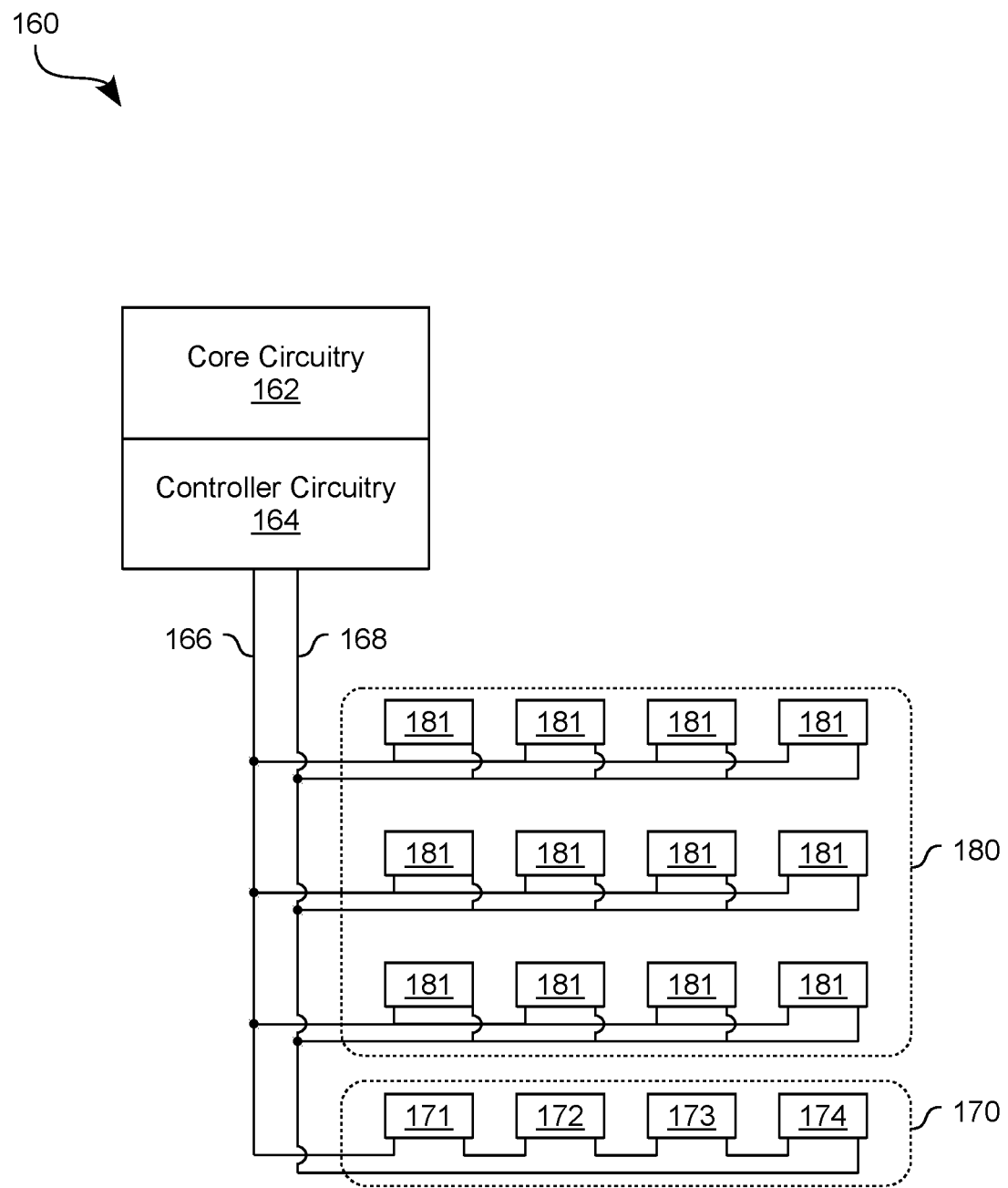
FIG. 1C is a functional block diagram illustrating elements of an integrated circuit including a pipeline circuit to perform in-memory computation according to an embodiment.

FIG. 1C shows features of an integrated circuit (IC) 160 to perform in-memory compute operations according to an embodiment. IC 160 has features of system 100 in some embodiments. As shown in FIG. 1C, IC 160 comprises core circuitry 162, controller circuitry 164, an interconnect 166, an interconnect 168, and a pipeline circuit 170 that—for example—correspond functionally to core circuitry 122, controller circuitry 124, interconnect 126, interconnect 128, and pipeline 110 (respectively). IC 160 comprises some or all circuitry of a processor—e.g., wherein core circuitry 162 provides some or all functionality of one or more processor cores.

Controller circuitry 164 comprises logic which, by controlling operation of pipeline circuit 170, enables access by core circuitry 162 to memory resources of pipeline circuit 170. In the example embodiment shown, pipeline circuit 170 and a cache memory 180 of IC 160 each comprise respective portions of such memory resources. Pipeline circuit 170 includes an in-series arrangement of multiple stages (such as the illustrative stages 171-174 shown) which, for example, correspond functionally to stages 112a, 112b, . . . , 112n.

Interconnect 166 is coupled to facilitate communication from controller circuitry 164 to an input interface of stage 171, and interconnect 168 is coupled to facilitate communication from an output interface of stage 174 to controller circuitry 164. At least some signaling between various respective ones of stages 171-174—e.g., including data signaling and, in some embodiments, command/address signaling—takes place entirely within pipeline circuit 170, and independent of any relaying of said signaling via controller circuitry 164. In such an embodiment, at least some portion of interconnect 166 and interconnect 168 is also used to access cache memory 180—e.g., wherein other portions of interconnect 166 and interconnect 168 variously branch and couple to facilitate signal communication between controller circuitry 164 and one or more arrays 181 (e.g., banks) of cache memory 180. Although interconnect 166, 168 are shown as distinct paths for signaling from and to (respectively) controller circuitry 164, some embodiments alternatively comprise signal lines coupled provide bi-directional signaling.

For some or all of stages 112a, . . . 112n, each such stage comprises a respective memory array and circuitry, coupled thereto, which is to perform an in-memory computation based on data currently stored at said memory array. For example, FIG. 1B shows features of a memory device 150, according to an embodiment, which is operable to function as a stage of a pipeline—wherein circuitry of memory device 150 is variously configurable to facilitate operation in an in-series arrangement with one or more similar memory devices. In an embodiment, memory device 150 provides functionality of one of stages 112a, 112b, . . . , 112n, for example. Certain features of stages 112a, 112b, . . . , 112n are described herein with reference to the illustrative memory device 150. It will be apparent, however, to one skilled in the art that some or all of stages 112a, 112b, . . . , 112n may each have one or more respective additional or alternative features.

In the example embodiment shown, memory device 150 comprises an input interface 151 (e.g., one of input interfaces 114a, 114b, . . . , 114n) to couple to a preceding pipeline stage or, alternatively, to an interconnect such as interconnect 126. Memory device 150 further comprises an output interface 152 (e.g., one of output interfaces 116a, 116b, . . . , 116n) to couple to a next pipeline stage or, alternatively, to an interconnect such as interconnect 128. Based on communication received via input interface 151, access logic AL 153 of memory device 150 facilitates, at least in part, access to an array MA 154 of memory cells (or "memory array"). Such access is provided for servicing one or more commands from SS 120 or, alternatively, from a preceding stage of a pipeline which includes memory device 150. Access logic AL 153 includes, or operate in conjunction with, logic of memory device 150 which provides memory resource access according to conventional techniques. In an embodiment, AL 153 includes or couples to command logic and address logic which is used to decode an access instruction to the proper memory location within MA 154. Command logic and address logic are implemented, for example, with a state machine or other such circuitry.

In an embodiment, array MA 154 includes any of a variety of types of memory technology wherein memory cells are arranged in rows and columns—e.g., where data stored by said cells is accessible via word lines and bit lines, or an equivalent thereof. In one embodiment, MA 154 includes static random-access memory (or "SRAM"). However, any of various other types of memory cell technologies may be adapted for operation to facilitate in-memory computation, as described herein. In the example embodiment shown, memory device 150 includes a memory array MA 154, which represents one or more logical and/or physical groups of memory. An example of one such grouping of memory is a bank of memory resources that, for example, includes storage elements arranged in rows and columns. In various embodiments, at least some data is stored in array 154 in an arrangement wherein the bits of a given value are stored in different respective word lines, the bits each accessible via the same bit line of the array (e.g., wherein the bits of the value are arranged along the bit line each according to their respective bit significance). Such an arrangement facilitates an in-memory computation which operates on bits of different values, where said bits have the same bit significance.

During operation of system 100, SS 120 sends commands or instructions to pipeline 110 over a bus of interconnect 126. Such commands are interpreted by memory device 150 (or other such device configured to implement stage 112a)—e.g. including access logic AL 153 of memory device 150 decoding command information to perform a variety of access functions within the memory and/or decoding address information with column logic and/or row logic. In an embodiment, such logic accesses a specific location in MA 154 with a combination of a column address strobe or signal (CAS) and a row address strobe or signal (RAS). Rows of memory may be implemented in accordance with known memory architectures or their derivatives. Briefly, a row of MA 154 includes one or more addressable columns of memory cells, as identified by the CAS generated by column logic of AL 153. In an embodiment, the rows are each variously addressable via the RAS generated by row logic of AL 153. A protocol used for such communication between SS 120 and pipeline 110 is supported with one or more state machines or other such circuitry of stages 112a, 112b, . . . , 112n (e.g., including the illustrative microcontroller μC 156 of memory device 150). In some embodiments, communications between SS 120 and pipeline 110 include operations adapted from one or more conventional techniques. By way of illustration and not limitation, μC 156 may supplement otherwise conventional command/address signaling functionality which, for example, conforms to some or all requirements of a dual data rate (DDR) specification such as the DDR3 SDRAM JEDEC Standard JESD79-3C, April 2008 or the like.

In an embodiment, memory device 150 further comprises circuitry IMCO 155 to perform one or more in-memory compute operations based on one or more data bits which are stored at MA 154. As described herein, IMCO 155 comprises any of various types of Boolean circuit logic to receive input signaling based on data stored in MA 154. Such Boolean circuitry may comprise, for example, one or more NOT gates and/or combinatorial logic (e.g., including an AND gate, OR gate, NAND gate, NOR gate, XOR gate and/or the like), in various embodiments. In-memory computing with IMCO 155 is based on signaling at one or more data lines (e.g., one or more bit lines or one or more word lines) of MA 154—e.g., wherein such signaling includes a first signal indicating a first logic state which is based on a first one or more stored data bits and, in some embodiments, a second signal indicating a second logic state which is based on the first one or more stored data bits (or alternatively, based on another one or more stored data bits). Based on such signaling, Boolean circuitry of IMCO 155 generates an output signal which represents or otherwise indicates an at least partial result of a computation using said logic state(s). In an embodiment, the one or more Boolean operations implement an addition of two values, a multiplication of two values, and/or any of a variety of other such operations, which are not limiting on some embodiments. Based on the output signal, MA 154 is operated—e.g., in combination with AL 153—to store one or more data bits which represent a result of an in-memory computation by IMCO 155.

To facilitate the providing of data for use in, or resulting from, an in-memory computation, memory device 150 further comprises logic (such as the illustrative configuration circuitry CFG 157 shown) which is to configure any of a plurality of operational modes each for variously accessing array MA 154. For example, CFG 157 comprises one or more switches, multiplexers, demultiplexers and/or other circuitry to variously enable or disable, selectively, one or more conductive paths in memory device 150. In some embodiments, the plurality of modes includes a mode to store to MA 154 data which memory device 150 has received from an external agent such as SS 120 or a preceding pipeline stage. In an embodiment, the plurality of modes further comprises a mode to communicate data between array 154 and IMCO 155, and a mode to communicate data from array MA 154 to output interface 152.

In some embodiments, results of in-memory computations are variously communicated each between a respective two of stages 112a, 112b, . . . , 112n—e.g., where one in-memory computation at a given stage of pipeline 110 is to operate on a result of another in-memory computation which was previously performed at an earlier stage of pipeline 110. Accordingly, pipeline 110 performs a sequence of in-memory computations—each at a respective one of stages 112a, 112b, . . . , 112n—to generate a final result that, for example, is communicated to SS 120 via interconnect 128. In some embodiments, a last stage of the pipeline (e.g., stage 112n) additionally or alternatively communicates a result of at least some in-memory computation back to one or more earlier stages of pipeline 110—e.g., as illustrated by the example feedback 119 shown. However, some embodiments are not limited in this regard, and pipeline 110 may alternatively omit any such feedback 119. Feedback 119 is used, for example, to perform a next recursion of a recursive data processing with pipeline 110. Alternatively or in addition, feedback 119 may be used to update weights values which are to be used in operations on other input data (if any) which is subsequently provided to pipeline 110 by SS 120.

Figure 2:
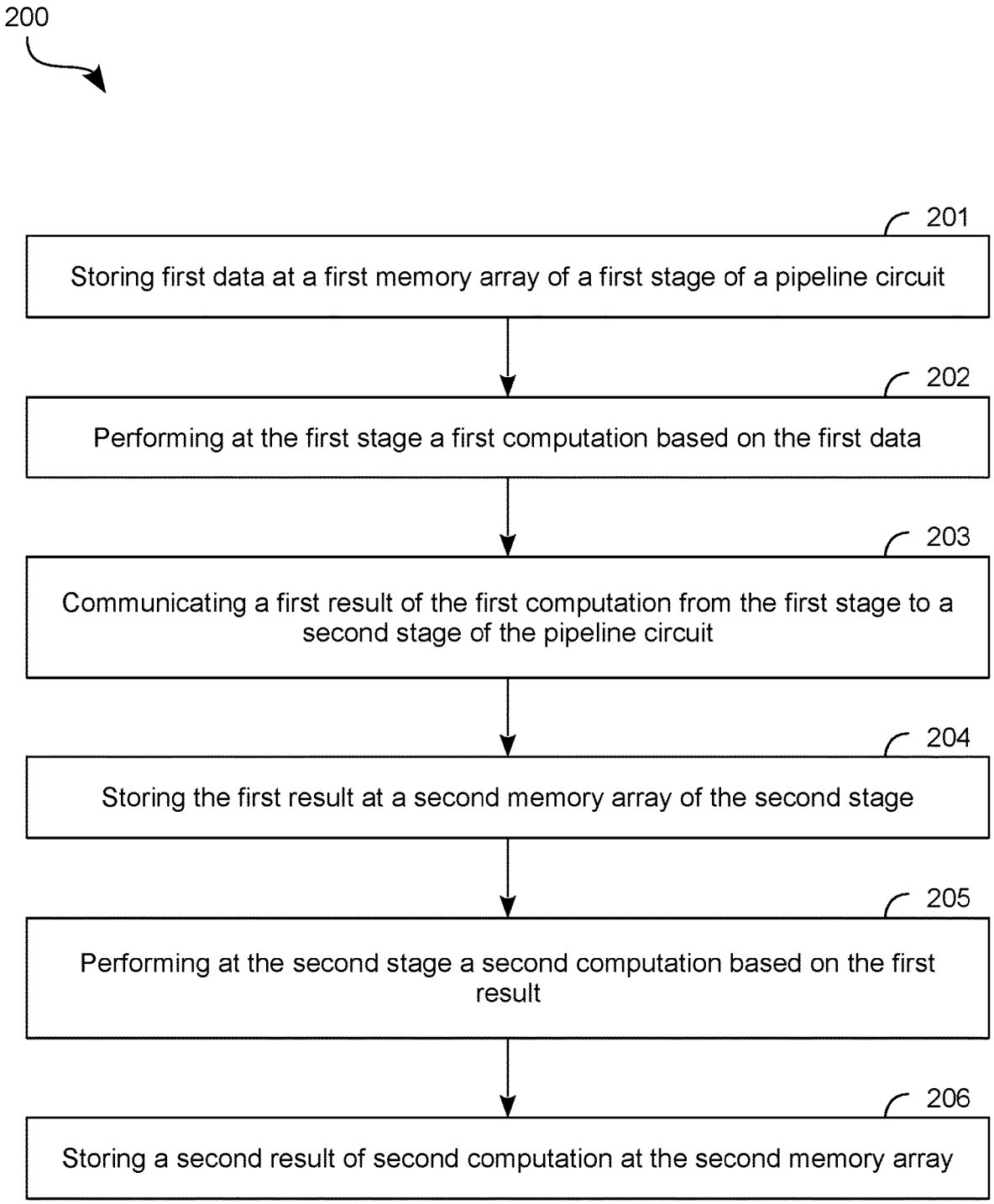
FIG. 2 is a flow diagram illustrating elements of a method for performing an in-memory computation with a pipeline according to an embodiment.

FIG. 2 shows features of a method 200 to perform pipeline processing of data according to an embodiment. Method 200 is one example of an embodiment wherein in-memory computations are performed sequentially each at a different respective stage of circuitry which includes a pipeline of multiple in-series stages. Method 200 is performed with circuitry of pipeline 110, for example.

As shown in FIG. 2, method 200 includes (at 201) storing first data at a first memory array of a first stage of a pipeline circuit. The pipeline circuit (including pipeline 110 and/or memory device 150, for example) comprises multiple stages arranged in an in-series configuration—e.g., where the multiple stages comprise a first stage and a second stage. In an embodiment, the first data is received at the pipeline circuit from cache control circuitry or other memory controller logic coupled to the pipeline circuit. In an embodiment, the first data includes synaptic weight values that, for example, variously represent neuron states of a neural network. Alternatively or in addition, the first data may include data that is to be operated on by such a neural network—e.g., wherein the first stage and the second stage are to implement different respective layers of the neural network.

Method 200 includes (at 202) performing at the first stage a first computation based on the first data stored at the first memory array. The performing at 202 may include IMCO 155 (or other suitable circuitry of the first stage) receiving, or otherwise detecting, a signal from the first memory array which indicates a logic state based on one or more bits of the first data. Based on the logic state, circuitry such as IMCO 155 performs any of a variety of computations to determine at least in part a value (e.g., single-bit or multi-bit) which, in some embodiments, is to be stored back to the first array.

After performing the first computation at 202, method 200 (at 203) communicates a first result of the first computation from the first stage to the second stage via a first interconnect of the pipeline circuit. The communicating at 203 is performed, for example, independent of the pipeline receiving from the memory controller any explicit command for such communication between the first stage and the second stage. In one embodiment, for example, control circuitry of the first stage and/or the second stage automatically initiates such communication in response to detecting a completion (actual or expected) of the first computation. Any signal communication between the first interconnect and the memory controller is to be via one or more stages of the multiple stages. In some embodiments, for example, the first interconnect is coupled to the memory controller only indirectly via the one or more stages of the multiple stages. In one such embodiment, the first stage and/or the second stage is also coupled to the memory controller only indirectly via a respective one or more other stages of the pipeline.

In an embodiment, method 200 further comprises (at 204) storing the first result at a second memory array of the second stage. The second stage provides its own in-memory computation functionality, whereby the pipeline is capable of performing multiple successive in-memory computations. Method 200 further comprises (at 205) performing at the second stage a second computation. based on the first result stored at the second memory array, and (at 206) storing a second result of second computation at the second memory array. In one example embodiment, the first stage and the second stage provide functionality of different respective layers of a neural network—e.g., wherein different stages each provide a respective one of a convolution layer, a pooling layer, a fully connected layer, or the like.

Figure 3:
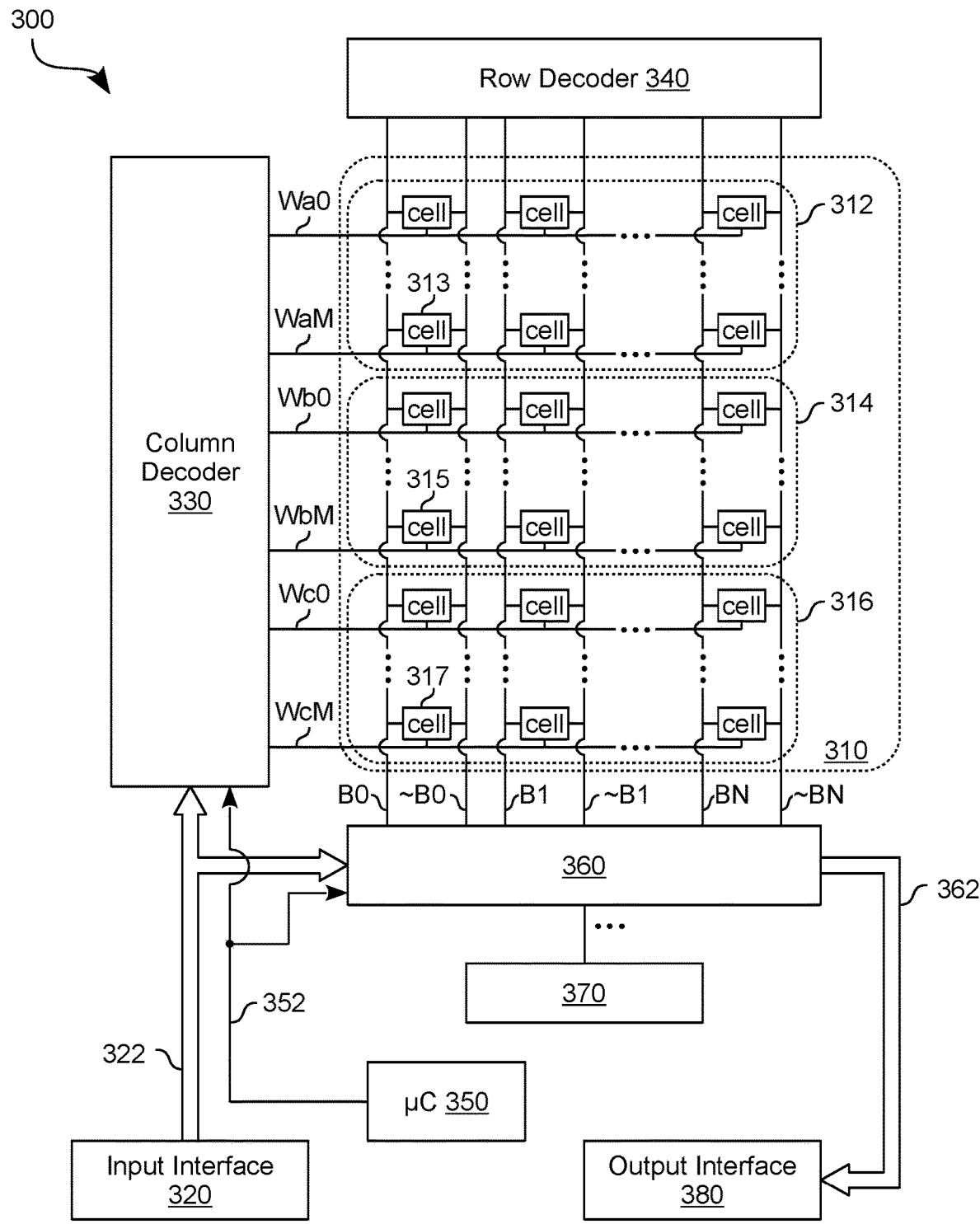
FIG. 3 is a functional block diagram illustrating elements of a memory device to function as a pipeline stage according to an embodiment.

FIG. 3 shows features of a device 300 to perform in-memory compute operations at a stage of a pipeline according to another embodiment. In an embodiment, device 300 includes features of pipeline 110 and/or memory device 150, for example, and/or is used to perform some or all of method 200. As shown in FIG. 3, device 300 comprises input circuitry 320 and output circuitry 380 to variously couple, and communicate with, a memory controller or other host logic (not shown). Input circuitry 320 and output circuitry 380 may, for example, provide functionality of input interface 151 and output interface 152, respectively. Device 300 further comprises an array 310 of memory cells which are arranged in rows and columns—e.g., wherein a given row of cells is accessible using a corresponding word line and wherein a given column of cells is accessible using at least one corresponding bit line.

Access logic of device 300 (e.g., providing functionality of AL 153) includes a column decoder 330 and a row decoder 340 to variously decode address information of a memory access command received in communications 322 via input circuitry 320. Communications 322 are received from a memory controller (or other host logic) or, alternatively, from a pipeline stage which precedes that which includes array 310. Based on decoding of communications 322, column decoder 330 and row decoder 340 variously operate word lines and bit lines to access one or more memory cells of array 310.

In the example shown, a given column of memory cells in array 310 is accessed using a corresponding pair of bit lines (or "line pair")—e.g., where said cells each have a six transistor (6T) memory cell architecture. For example, bit lines of array 310 include a pair of bit lines [B0, ~B0], where the logic state of a single stored bit is able to be communicated with bit line B0 while the opposite of that logic state is communicated with bit line ~B0. Similarly, an adjoining column of memory cells is able to be accessed with a line pair [B1, ~B1]—e.g., where another column of memory cells is accessed with a line pair [BN, ~BN].

The coupling of multiple cells in the same column to the same bit line—e.g., to bit line B0—enables said bit line to communicate a signal which represents a logical AND'ing of the respective bits stored by said multiple cells. Similarly, the complementary bit line—e.g., bit line ~B0—is able to concurrently communicate another signal which represents a logical AND'ing of the opposite states of said bits. For example, array 310 is shown as including a sub-array 312 accessible with word lines Wa0, . . . , WaM, another sub-array 314 accessible with word lines Wb0, . . . , WbM, and another sub-array 316 accessible with word lines Wc0, . . . , WcM. This particular arrangement of subarrays 312, 314, 316 is merely illustrative of one use for device 300, and is not limiting on some embodiments.

In one such embodiment, word lines WaM, WbM (for example) are able to be concurrently operated to access cells 313, 315 which are in respective sub-arrays 312, 314 and also in the same column—e.g., while cell 313 stores a bit A and cell 315 stores a bit B. As a result of such operating, a voltage level at bit line B0 indicates a logic level which is equivalent to the AND'ed combination (A·B). By contrast, a concurrent voltage level at bit line ~B0 indicates a logic level which is equivalent to the AND'ed combination (!A·!B).

Device 300 includes circuitry 370—e.g., providing functionality of IMCO 155—which is operable to perform one or more in-memory compute operations based on such signaling by bit lines B0, ~B0 (and/or signaling by one or more additional or alternative line pairs). For example, circuitry 370 is coupled to bit lines of array 310 via circuitry 360—e.g., providing functionality of CFG 157—that is operable to selectively enable, at least in part, any one of an in-memory compute mode or one or other modes which support data reads from array 310 and/or data writes to array 310. For example, circuitry 360 is able to selectively determine—e.g., responsive to signaling 352 from control circuitry μC 350 (such as microcontroller μC 156)—whether data signals are to be directed to circuitry 370 or to an output path 362 for communication from device 300 via output circuitry 380. In an embodiment, circuitry 360 further provides sense amplifier and/or driver functionality to facilitate a communication of data to output path 362 and/or a data write back to array 310 using signaling output from circuitry 370.

Based on signaling at one or more bit lines of array 310, circuitry 360 indicates one or more corresponding logic states for use by circuitry 370—e.g., for use in performing one or more in-memory computations. A result of such one or more in-memory computations is able to be written back to a cell of array 310—e.g., via circuitry 360—and, in some embodiments, is able to be subsequently communicated from memory device 300 to a later pipeline stage. In one example embodiment, subarray 316 is to store (e.g., at a cell 317) a result of an in-memory computation which is based both on a first value stored at sub-array 312, and on a second value stored at sub-array 314. Circuitry 370 facilitates, for example, the performance of one or more convolution calculations based on data stored at array 310. However, any of a variety of other in-memory computations and data writes may be performed, in different embodiments.

In some embodiments, circuitry 360 (or other suitable configuration logic of device 300) provides a further operational mode which is to pass data through device 300—e.g., without such data being used by circuitry 370 and wherein any storage of such data is at a memory array other than array 310. By way of illustration and not limitation, in some embodiments, μC 350 snoops communications 322 or otherwise perform operations which detect that input interface 320 has received (or will receive) some data which is to be stored at a subsequent pipeline stage. In response to such detecting, μC 350 configures circuitry 360 (or other suitable logic of device 300) to provide a pass-through interconnect path between input interface 320 and output interface 380. Accordingly, device 300 is operable to efficiently relay data for storage at a later pipeline stage—e.g., without requiring additional memory write operations, memory read operations and associated communications in support thereof.

Figure 4:
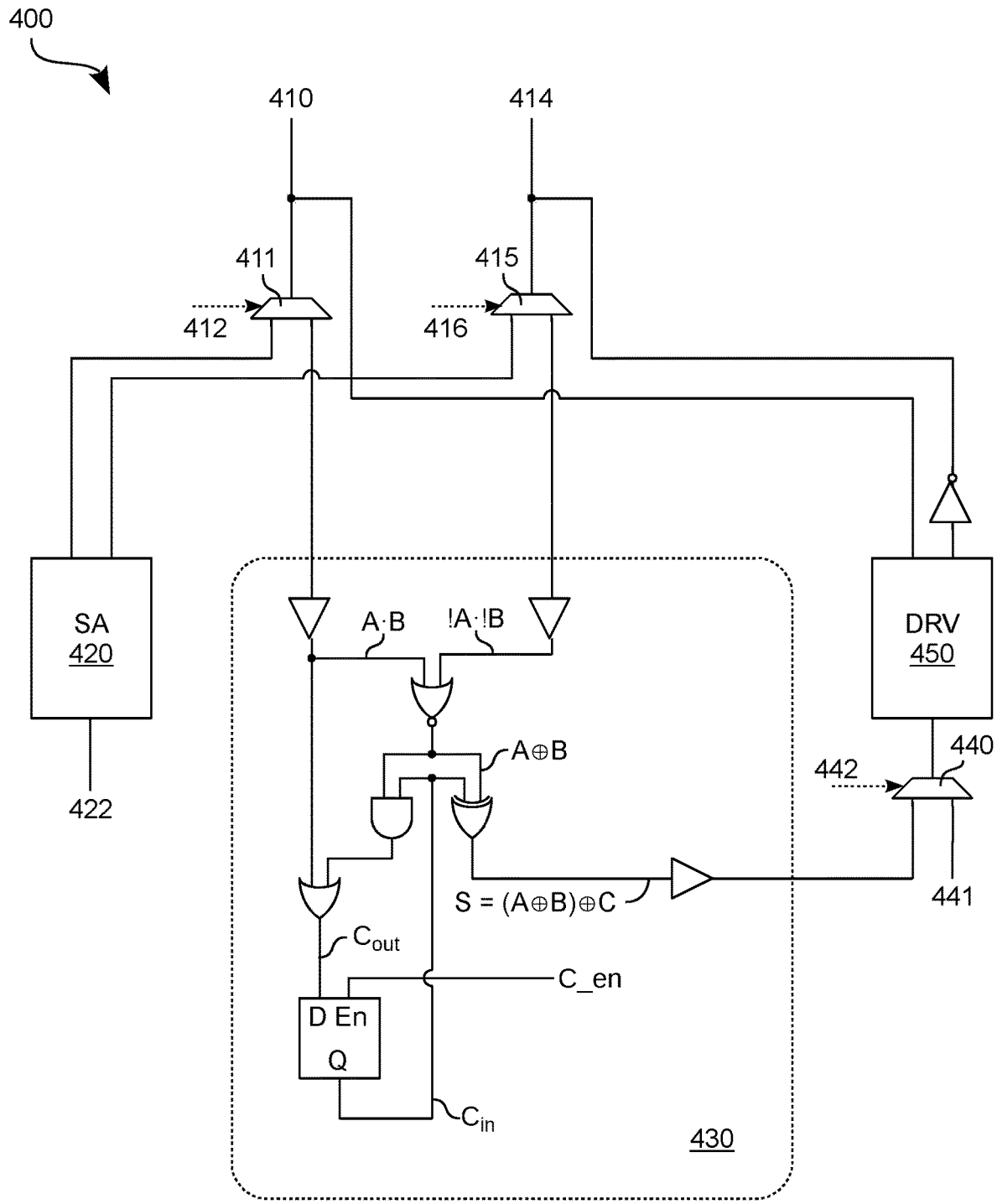
FIG. 4 is a hybrid functional block and circuit diagram illustrating elements of a memory device to perform an in-memory computation according to an embodiment.

FIG. 4 shows features of a memory device 400 to provide a pipeline stage for in-memory computation according to an embodiment. In an embodiment, memory device 400 provides functionality of memory device 150, of device 300 or of one of pipeline stages PS 112a, PS 112b, . . . , PS 112n—e.g., wherein memory device 400 is to perform one or more operations of method 200.

As shown in FIG. 4, memory device 400 comprises circuitry 430 which (for example) provides functionality of one of IMCO 155, circuitry 370 or the like. Switch logic of memory device 400 (e.g., including the illustrative demultiplexer DMUX 411, and multiplexer MUX 440 shown) is coupled to selectively enable and/or disable various conductive paths between circuitry 430 and a bit line 410. Similarly, one or more conductive paths between circuitry 430 and another bit line 414 can be variously enabled and/or disabled, selectively, with switch logic such as MUX 440 and another demultiplexer DMUX 415.

With such switch logic, control signals 412, 416, 442 facilitate any one of an in-memory compute mode or one or other modes which support reads from the memory array and/or writes to the memory array. For example, in some embodiments, a data read includes sense amplifier circuitry SA 420 of memory device 400 outputting one or more data signals 422 which are based on signaling from bit lines 410, 414—e.g., wherein a data write includes a driver circuitry DRV 450 outputting to one of bit lines 410, 414 a signal which is based on another data signal 441 received by memory device 400. Alternatively, driver circuitry DRV 450 (or other circuitry of memory device 400) is operable to output a result of an in-memory computation.

During an in-memory compute mode of memory device 400, circuitry 430 is able to receive signals from bit lines 410, 414 via DMUX 411 and DMUX 415 (respectively). In an embodiment, bit line 410 communicates a first signal representing a logic state which is based on a first one or more stored bits—e.g., wherein bit line 414 communicates a second signal representing another logic state based on the first one or more stored bits (or alternatively, based on another one or more stored bits). An in-memory operation on such states is implemented by combinatorial logic of circuitry 430 which receives the first signal and the second signal.

In the embodiment shown, bit lines 410, 414 are a pair of complementary bit lines (such as line pair B0, ~B0, or line pair B1, ~B2, or line pair BN, ~BN). In one example scenario, a first memory cell storing a bit A is coupled to each of a first word line and bit lines 410, 414. Similarly, a second memory cell storing a bit B is coupled to each of a second word line and the bit lines 410, 414. Both the first cell and the second cell are able to be accessed concurrently using each of the first word line, the second word line, and bit lines 410, 414. Such accessing results in bit line 410 communicating a first signal which indicates a first logic state based on bits A, B—e.g., where a voltage level of the first signal indicates the equivalent of a logical AND'ing of bits A, B (i.e., the function A·B). Such an AND'ing is be due at least in part to the first memory cell and the second memory cell each being tied to bit line 410. Moreover, the accessing also results in bit line 414 communicating a second signal which indicates the equivalent of a logical AND'ing of the opposite bit values (i.e., the function !A·!B).

With such signals, combinatorial logic of circuitry 430 performs an in-memory computation which (for example) adds a first stored value, which includes bit A, and a second stored value, which includes bit B. More particularly, circuitry 430 outputs a value S representing a bit of the arithmetic sum (A+B). In an embodiment, calculation of value S is further based on a carry bit C_en which, for example, is determined based on a calculation (not shown) of a next less significant bit of said arithmetic sum. Such calculation of value S also results in the determining of another carry bit C_out which, for example, is available for use in the calculation of some next more significant bit (if any) of said arithmetic sum.

Figure 5:
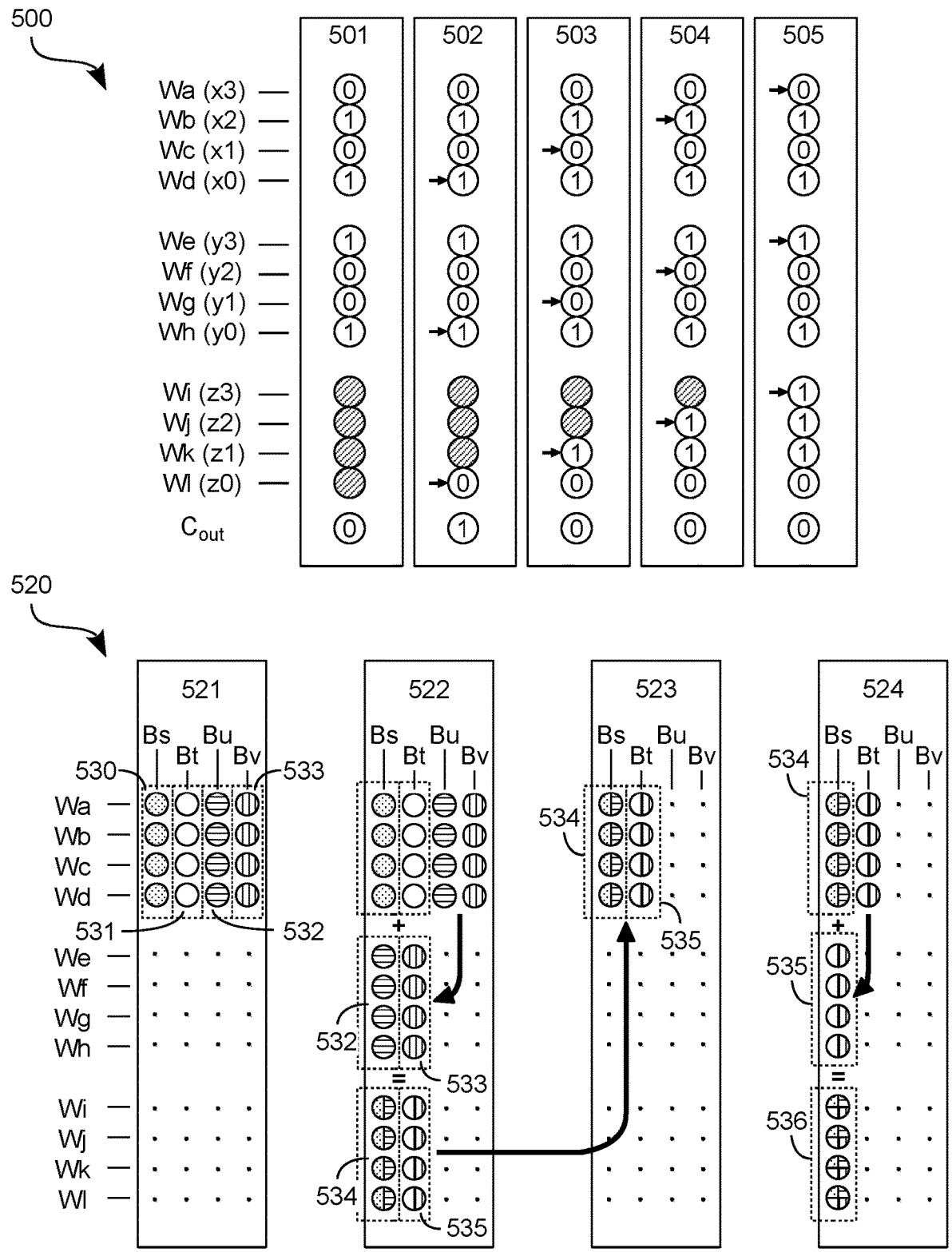
FIG. 5 is a sequence diagram illustrating various states of a memory array during in-memory computations according to an embodiment.

FIG. 5 illustrates a sequence 500 of states 501-505 of a memory array during in-memory computations performed with a pipeline circuit architecture according to an embodiment. In an embodiment, sequence 500 is performed, for example, with one of memory device 150, 400, with device 300, or with one of stages PS 112a, PS 112b, . . . , PS 112n. In one example embodiment, some or all of sequence 500 is based on computations by circuitry 370 or circuitry 430—e.g., where such computations are according to method 200.

Sequence 500 illustrates one embodiment wherein computations at a pipeline stage are based on data which is stored in a bit-serial format, wherein multiple bits of a given data value (e.g., including at least a portion of said data value) are stored along a single bit line of a memory array—e.g., the bits arranged in different respective word lines of the array each according to their respective bit significance. The memory array includes memory cells arranged in columns and rows to be variously accessed, respectively, by corresponding bit lines and word lines (respectively). Some cells of the memory array are variously located, for example, each in single column and each in a respective one of rows Wa through Wl.

In one example scenario, the column of memory cells stores, at state 501, a first multi-bit value [x3-x0] equal to "0101" and a second multi-bit value [y3-y0] equal to "1001." By way of illustration and not limitation, a synaptic weight value or other state of a neural network includes one of [x3-x0] and [y3-y0]—e.g., wherein other data, to be processed by said neural network, includes the other of [x3-x0] and [y3-y0]. In such an embodiment, in-memory computations during sequence 500 calculates a value [z3-z0] representing an arithmetic sum of [x3-x0] and [y3-y0]. This multi-bit value [z3-z0] is available to be further processed by additional in-memory processing at the same pipeline stage or, alternatively, to be communicated for use in other in-memory processing at a subsequent pipeline stage.

In the illustrative embodiment shown, rows Wa through Wd each store a different respective bit of the first multi-bit value (where Wa and Wd correspond, respectively, to a most significant bit and a least significant bit of [x3-x0]). Similarly, rows We through Wh are each store a different respective bit of the second multi-bit value (where We and Wh correspond, respectively, to a most significant bit and a least significant bit of [y3-y0]). At state 501, a carry bit Cout is equal to 0—e.g., where state 501 is not based on any previous in-memory calculation that might be associated with [x3-x0] and [y3-y0].

State 502 illustrates stored data (at array 310, for example) after an in-memory computation is performed— e.g., with circuitry 430—to determine, based on bits x0, y0, a least significant bit z0 of the [z3-z0]. The bit z0 is written, for example, to a cell of the same array column which also stores [x3-x0] and [y3-y0]—e.g., where row W1 includes the cell. In this particular example, the in-memory computation results in carry bit Cout being set to 1. In a similar manner, states 503, 504, 505 are variously based on successive in-memory computations each to determine, based on corresponding bits of [x3-x0] and [y3-y0], a respective next significant bit of [z3-z0]. In state 505, bits of [z3-z0] are each stored at a different respective one of rows Wi through W1.

By building on relatively simple arithmetic operations such as that illustrated by sequence 500—e.g., including multi-bit addition, multiplication, division, subtraction, etc.—complex in-memory computations are able to be performed within a given pipeline stage and/or across multiple pipeline stages to implement neural networks and/or other such functionality.

FIG. 5 also shows a sequence 520 of states 521-524 of a memory array during in-memory bit-serial computations at a pipeline circuit architecture according to an embodiment. The bit-serial computations illustrated by sequence 520 may include those which are illustrated by sequence 500, for example. The memory array includes memory cells arranged in columns and rows to be variously accessed, respectively, by corresponding bit lines and word lines (respectively). Some cells of the memory array are variously located, for example, each in a respective one of a columns Bs, Bt, Bu and By and each in a respective one of rows Wa through W1. At state 521, multi-bit values 530 through 533 are variously stored, in a bit-serial format, each in a different respective one of columns Bs, Bt, Bu, By—e.g., wherein each of rows Wa through Wd variously store respective bits of each of values 530 through 533.

As illustrated by state 522, values 532, 533 are copied or moved—e.g., row-wise and column-wise—to cells in columns Bs, Bt (respectively)—e.g., wherein each of rows We through Wh variously store respective bits of each of values 532, 533. Subsequently, in-memory bit-serial computations are performed based on bits stored in column Bs to determine a value 534 which, for example, represents an arithmetic sum of values 530, 532. Similarly, other in-memory bit-serial computations (based on bits stored in column Bt) are able to be performed to determine another value 535 which represents an arithmetic sum of values 531, 533. In one such embodiment, each of rows Wi through W1 variously store respective bits of each of the values 534, 535.

This sort of data shifting and subsequent in-memory bit-serial computation—using data which has bit-serial (column-wise) arrangement—are able to be repeated multiple times at a given stage. For example, the values 534, 535 are subsequently be copied or moved—e.g., row-wise—to other cells in columns Bs, Bt (respectively). As a result, each of rows Wa through Wd variously store respective bits of each of values 534, 535 (as illustrated by state 523). As shown at state 524, value 535 then be copied or moved (row-wise and column-wise) from column Bt to cells in column Bs—e.g., where each of rows We through Wh stores a different respective bit of value 535. Subsequent in-memory bit-serial computations based on bits stored in column Bs result in the determining of another value 536 which, for example, represents an arithmetic sum of values 534, 535. In such an embodiment, rows Wi through W1 each store a different respective bit of value 536.

Figure 6:
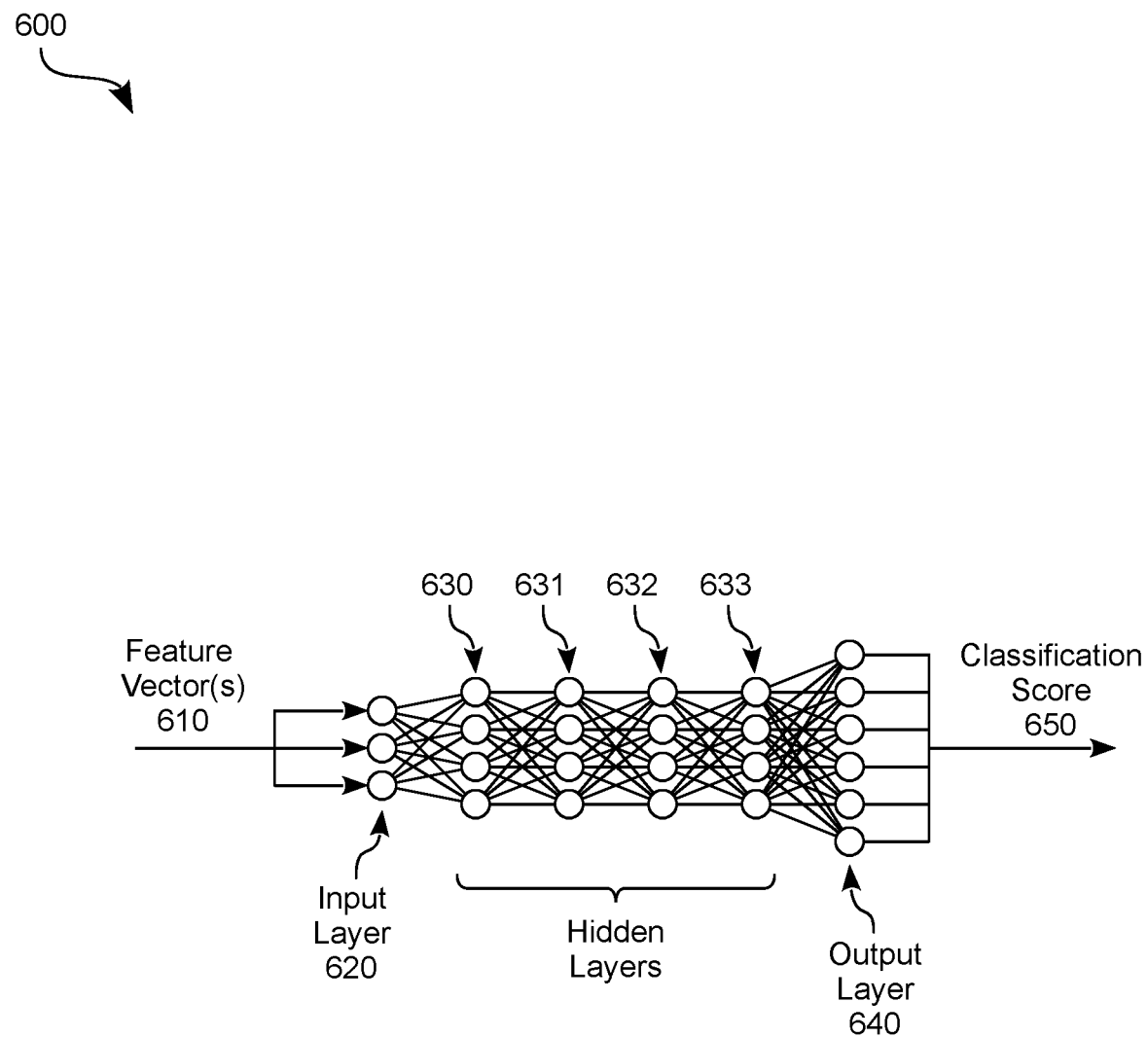
FIG. 6 is a node diagram illustrating elements of a neural network implemented with in-memory computations by a pipeline circuit architecture according to an embodiment.

FIG. 6 shows features of a neural network 600 implemented with memory devices arranged in a pipeline architecture according to an embodiment. Neural network 600 includes any suitable neural network such as an artificial neural network, a deep neural network, a convolutional neural network, or the like. In an embodiment, neural network 600 is provided with functionality of pipeline 110—e.g., with a pipeline circuit architecture which includes one or more of memory devices 150, 400 or device 300.

As shown in FIG. 6, neural network 600 includes an input layer 620, hidden layers 630-633, and an output layer 640. Neural network 600 is illustrated as having three input nodes, hidden layers with four nodes each, and six output nodes for the sake of clarity of presentation. Although some embodiments are not limited in this regard, input layer 620 may include multiple nodes. For example, input layer 620 includes a number of nodes equal to the number of elements in a feature vector for a time window multiplied by the number of feature vectors stacked for evaluation by neural network. In an embodiment, feature vectors have 23 elements and 11 feature vectors are stacked such that input layer 620 has 253 nodes. In other examples, feature vectors have fewer or more elements, and fewer or more feature vectors may be stacked. For example, in some embodiments, input layer 620 alternatively has 200 to 300 nodes, 300 to 400 nodes, or more nodes.

Furthermore, as in the illustrated example, neural network 600 includes four hidden layers 630-633. However, in other examples, neural network includes three, five, six, or more hidden layers. Hidden layers 630-633 may include any number of nodes. For example, hidden layers 630-633 may include 1,500 to 2,000 nodes, 2,000 to 2,500 nodes, or the like. In an embodiment, neural network 600 includes six hidden layers each having 2,048 nodes. In some examples, hidden layers 630-633 have the same number of nodes and in other examples, one or more layers may have different numbers of nodes. Output layer 640 includes any suitable number of nodes such that classification scores 650 include values for comparison and/or search to determine textual elements, recognized word sequences, voice recognition, image recognition, gesture recognition or the like. In one example embodiment, one or more applicable statistical models include a Hidden Markov Model (HMM), where classification scores 650 have a number of scores (for each time instance) equal to a number of HMM active states or a number of available HMM states. In some examples, output layer 640 includes a number of nodes equal to the number of available HMM states. For example, output layer 640 may include 3,500 to 4,500 nodes, 4,500 to 5,500 nodes, or 5,500 to 6,500 nodes or more. In an embodiment, output layer 640 includes 5,000 nodes. In the illustrated example, data flows from the left to the right from input layer 620, through hidden layers 630-633, and through output layer 640 as shown such that the output of input layer 620 is the input to hidden layer 630, the output of hidden layer 630 is the input to hidden layer 631 and so on, and such that the output of output layer 640 is the output of neural network 600 (e.g., classification scores 650). In some examples, such as in the illustrated example, every node in a layer is connected to every node in the adjacent layer (e.g., where the layers are fully connected). For example, in some embodiments, every node of input layer is connected to every node of hidden layer 630, every layer of hidden layer 630 is connected to every node of hidden layer 631, and so on. In other examples, some connections between nodes are not made.

As discussed, feature vectors 610 is provided to neural network 600 and neural network 600 provides classification scores 650—e.g., with output layer 640. Exemplary details associated with determinations made at the nodes of neural network 600 (as well as the data types used for such determinations) are discussed further herein. In some examples, neural network 600 is implemented for speech recognition in a test or implementation phase after neural network 600 has been trained in a training phase. Such a training phase is able to determine weights for nodes of neural network 600, biases for nodes of neural network 600, and the like.

During a training phase, weights and/or biases or the like are determined for neural network 600. The weights for nodes of neural network 600 are determined as any suitable number format or representation, such as a 32-bit floating-point representation. However, implementing neural network 600 using such 32-bit floating-point weights (or weights having similar number representations) may be computationally intensive and may cause problems with performance or battery life or the like. In some embodiments, weights are converted to fixed point integer values having an associated scaling factor and corresponding correction values are determined for some of the weights.

The figures described herein detail exemplary architectures and systems to implement embodiments of the above. In some embodiments, one or more hardware components and/or instructions described herein are emulated as detailed below, or implemented as software modules.

Embodiments of the instruction(s) detailed above are embodied may be embodied in a "generic vector friendly instruction format" which is detailed herein. In other embodiments, such a format is not utilized and another instruction format is used, however, the description herein of the writemask registers, various data transformations (swizzle, broadcast, etc.), addressing, etc. is generally applicable to the description of the embodiments of the instruction(s) above. Additionally, exemplary systems, architectures, and pipelines are detailed herein. Embodiments of the instruction(s) above may be executed on such systems, architectures, and pipelines, but are not limited to those detailed.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Figure 7:
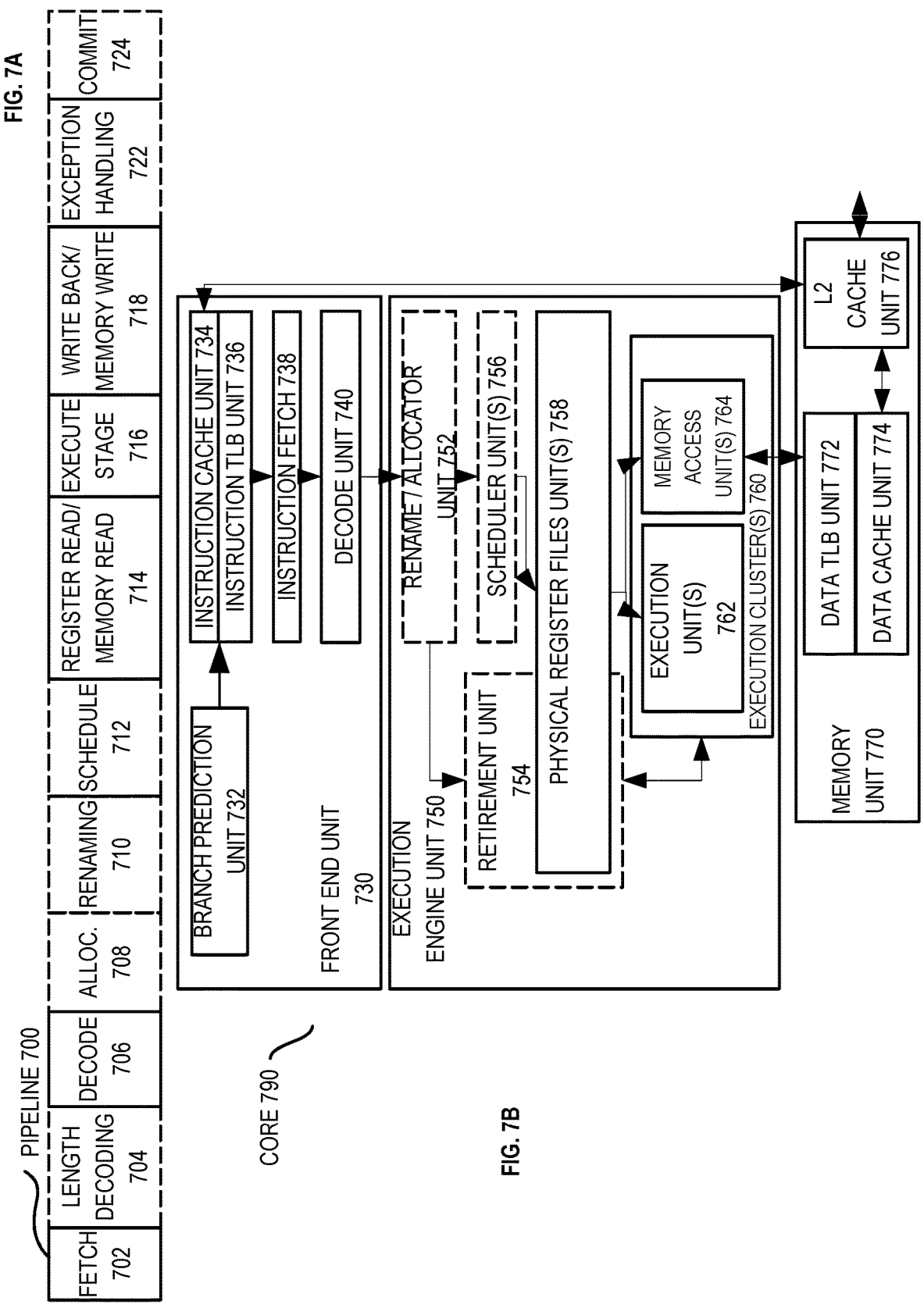
FIG. 7A is a block diagram illustrating both an exemplary in-order pipeline and an exemplary register renaming, out-of-order issue/execution pipeline according to embodiments of the invention.
FIG. 7B is a block diagram illustrating both an exemplary embodiment of an in-order architecture core and an exemplary register renaming, out-of-order issue/execution architecture core to be included in a processor according to embodiments of the invention.

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front-end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front-end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front-end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general-purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L) internal cache, or multiple levels of internal cache. In some embodiments, the system may include a combination of an internal cache and an external cache that is external to the core and/or the processor. Alternatively, all of the cache may be external to the core and/or the processor.

Figure 8:
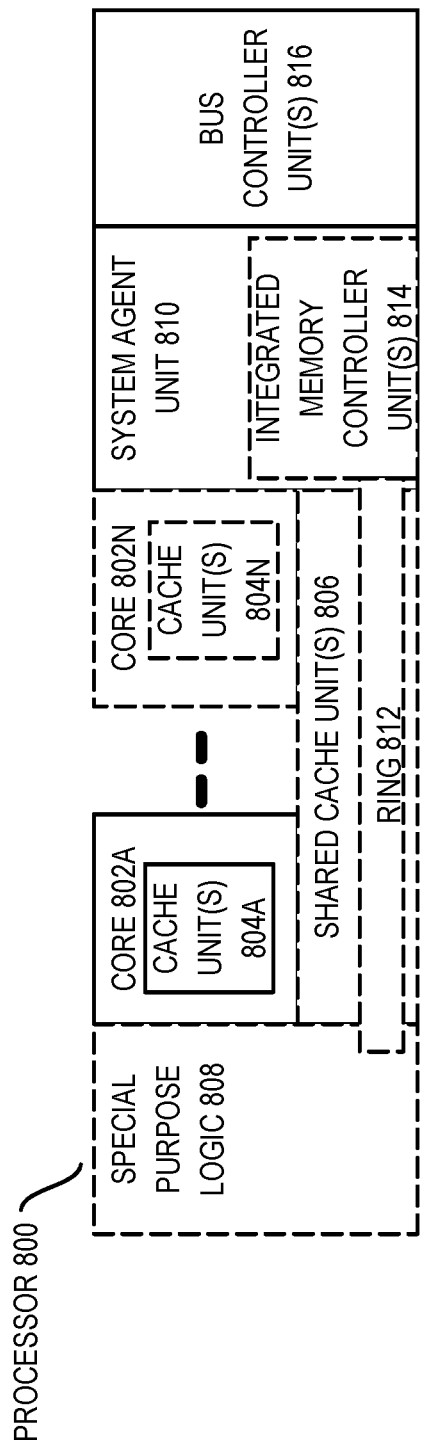
FIG. 8 is a block diagram of a processor that may have more than one core, may have an integrated memory controller, and may have integrated graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores (e.g., including cache units 804A-N), a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring-based interconnect unit 812 interconnects the integrated graphics logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802A-N.

In some embodiments, one or more of the cores 802A-N are capable of multithreading. The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Figure 9:
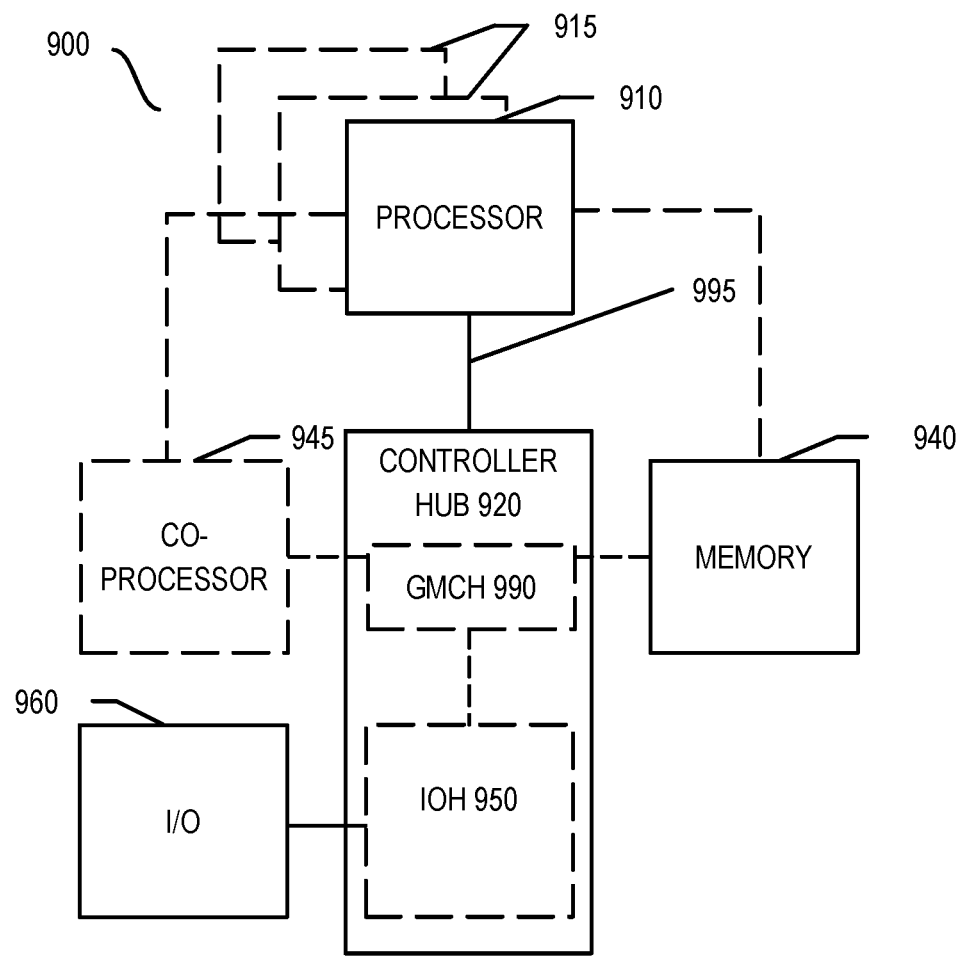
FIGS. 9 through 11 are block diagrams of exemplary computer architectures.
Figure 10:
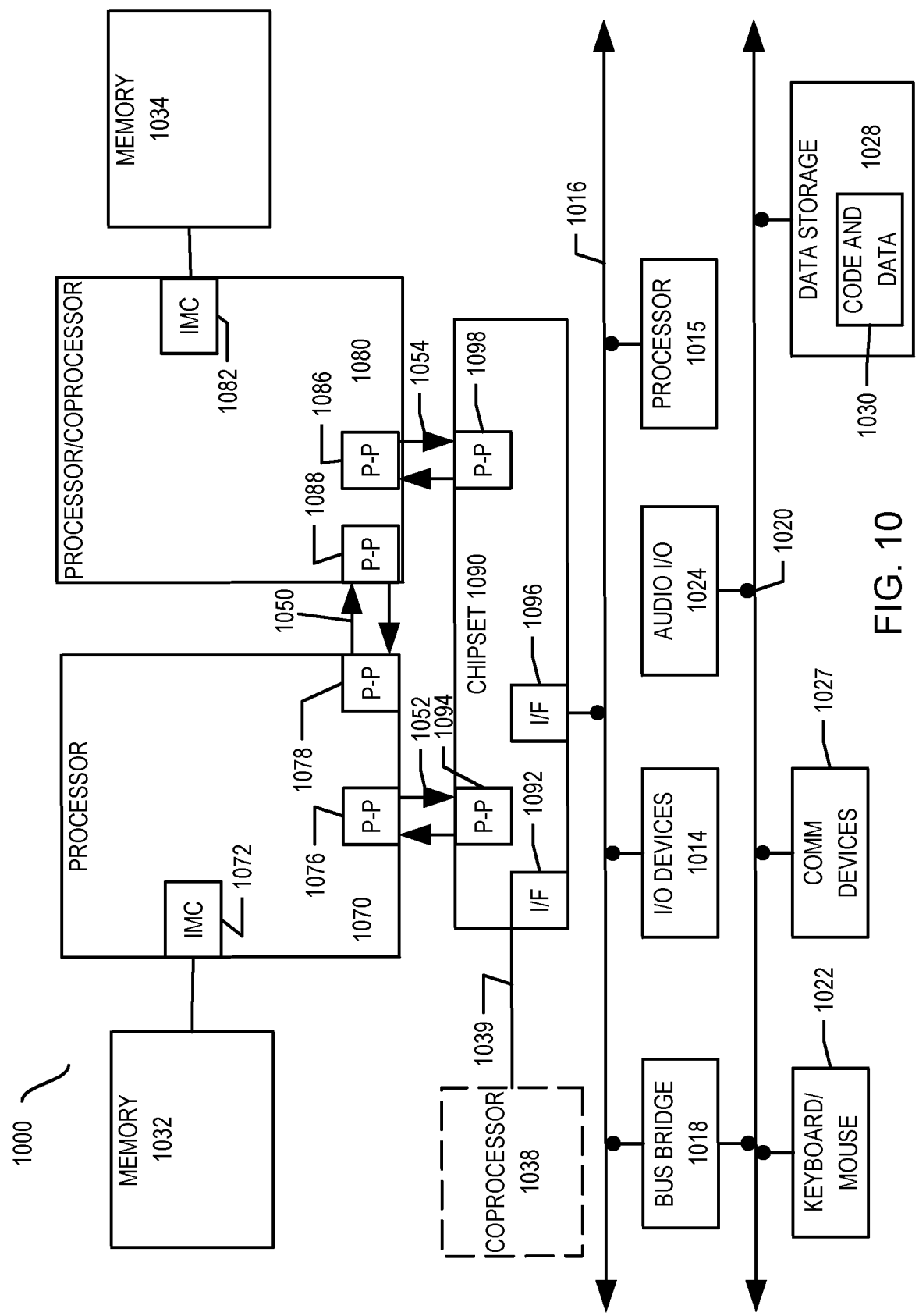
Figure 11:
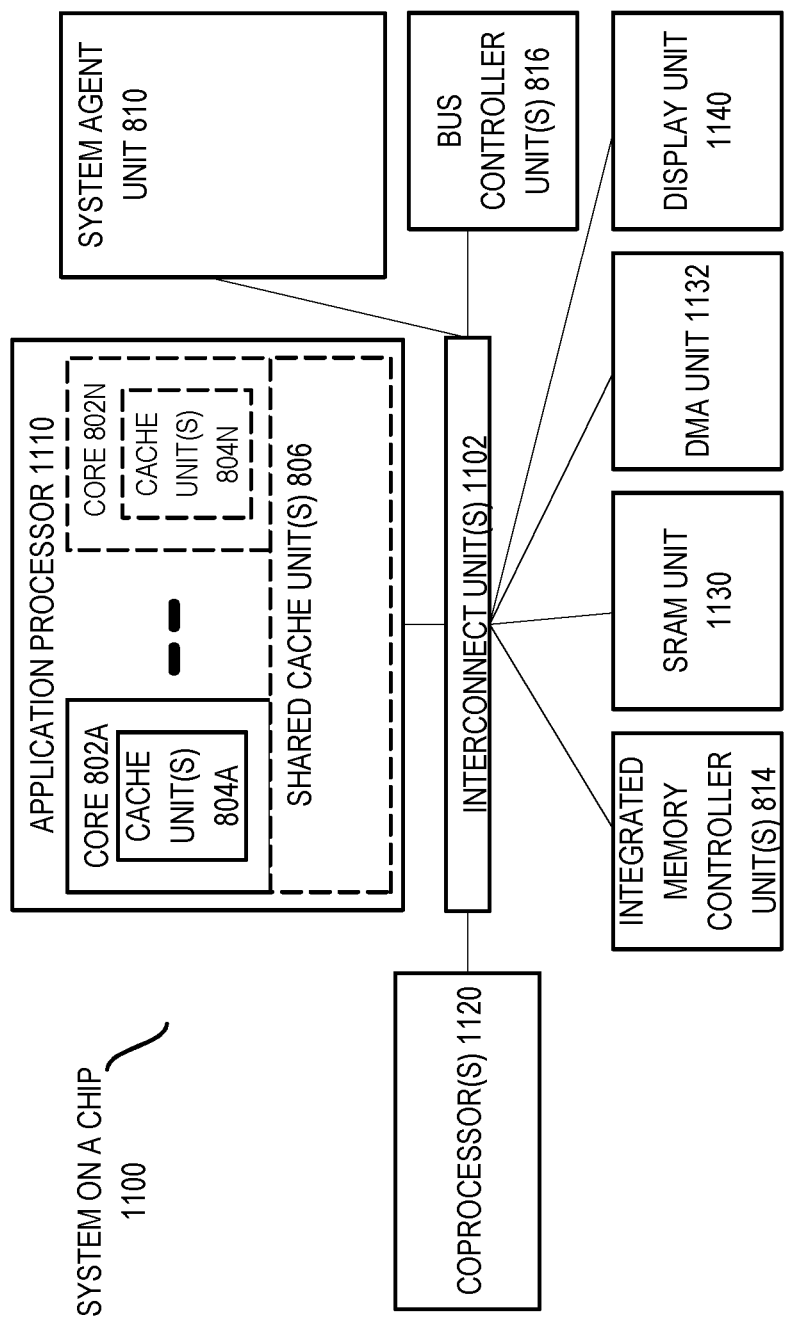

FIGS. 9-11 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 9, shown is a block diagram of a system 900 in accordance with one embodiment of the present invention. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 800.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the invention, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1092 and an interconnect 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Referring now to FIG. 11, shown is a block diagram of a SoC 1100 in accordance with an embodiment of the present invention. Similar elements in FIG. 8 bear like reference numerals. Also, dashed lined boxes are optional features on more advanced SoCs. In FIG. 11, an interconnect unit(s) 1102 is coupled to: an application processor 1110 which includes a set of one or more cores 802A-N and shared cache unit(s) 806; a system agent unit 810; a bus controller unit(s) 816; an integrated memory controller unit(s) 814; a set or one or more coprocessors 1120 which may include integrated graphics logic, an image processor, an audio processor, and a video processor; an static random access memory (SRAM) unit 1130; a direct memory access (DMA) unit 1132; and a display unit 1140 for coupling to one or more external displays. In one embodiment, the coprocessor(s) 1120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Techniques and architectures for performing in-memory computations are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A pipeline circuit for performing an in-memory computation, the pipeline circuit comprising:
   a first stage of multiple stages of the pipeline circuit, the multiple stages arranged in an in-series configuration, the first stage comprising:
      a first interface to receive first data from a controller circuit coupled to the pipeline circuit;
      a first memory array to store the first data; and
      first circuitry coupled to the first memory array, the first circuitry to perform a first read of the first data from the first memory array, to perform a first computation based on the first read of the first data, and to store a first result of the first computation at the first memory array, wherein the first computation comprises a first operation on first operands which are each read from a respective addressable location of the first memory array;
   an interconnect coupled to receive from the first stage second data which is based on the first result, wherein any communication between the interconnect and the controller circuit is to be via one or more of the multiple stages;
   a second stage of the multiple stages, the second stage comprising:
      a second interface to receive the second data from the interconnect;
      a second memory array to store the second data; and
      second circuitry to perform a second read of the second data from the second memory array, to perform a second computation based on the second read of the second data, and to store a second result of the second computation at the second memory array, wherein the second computation comprises a second operation on second operands which are each read from a respective addressable location of the second memory array.

2. The pipeline circuit of claim 1, wherein the first circuitry to perform the first computation comprises the first circuitry to automatically perform multiple accesses to the first memory array according to a sequence which is predefined at the first stage.

3. The pipeline circuit of claim 1, wherein the first stage and the second stage are to automatically communicate the second data independent of any explicit command from the controller circuit to communicate the second data.

4. The pipeline circuit of claim 1, wherein the second stage is further to:
   receive third data from the first stage; and
   pass the third data through to a respective subsequent stage of the pipeline circuit, wherein any storage of the third data at a memory array is external to the second stage.

5. The pipeline circuit of claim 1, wherein the first stage is further to:
   receive a feedback from a respective subsequent stage of the multiple stages; and
   perform, based on the feedback, a next recursion of a recursive data processing with the pipeline circuit.

6. The pipeline circuit of claim 1, wherein the pipeline circuit is to receive the first data via another interconnect which is coupled between the pipeline circuit and the controller circuit, wherein a portion of the other interconnect is further coupled between the controller circuit and a cache memory.

7. The pipeline circuit of claim 6, wherein a processor comprises the cache memory and the pipeline circuit.

8. The pipeline circuit of claim 7, wherein a core of the processor comprises the cache memory.

9. The pipeline circuit of claim 1, wherein a multi-core processor comprises the pipeline circuit.

10. The pipeline circuit of claim 1, wherein the first memory array and the second memory array comprise static random access memory cells.

11. The pipeline circuit of claim 1, wherein the first circuitry to perform the first computation or the second circuitry to perform the second computation comprises one of the first circuitry or the second circuitry to perform a bit-serial computation.

12. A processor for performing an in-memory computation, the processor comprising:
   a processor core comprising a controller circuit;
   a pipeline circuit coupled the controller circuit, the pipeline circuit comprising:
      a first stage of multiple stages of the pipeline circuit, the multiple stages arranged in an in-series configuration, the first stage comprising:
         a first memory array to store first data provided by the controller circuit; and
         first circuitry coupled to perform a first in-memory computation based on a read of the first data from the first memory array, wherein the first computation comprises a first operation on first operands which are each read from a respective addressable location of the first memory array, wherein the first circuitry is further to store a first result of the first in-memory computation to the first memory array;

an interconnect coupled to receive from the first stage second data which is based on the first result, wherein any communication between the interconnect and the controller circuit is to be via one or more of the multiple stages;

a second stage of the multiple stages, the second stage comprising:
  a second memory array to receive and store the second data; and
  second circuitry coupled to access the second memory array, and to perform a second in-memory computation based on a read of the second data from the second memory array, wherein the second circuitry is to store a second result of the second in-memory computation to the second memory array, wherein the second computation comprises a second operation on second operands which are each read from a respective addressable location of the second memory array.

13. The processor of claim 12, wherein the first circuitry to perform the first in-memory computation comprises the first circuitry to automatically perform multiple accesses to the first memory array according to a sequence which is predefined at the first stage.

14. The processor of claim 12, further comprising a cache memory, wherein the pipeline circuit is to receive the first data via another interconnect which is coupled between the pipeline circuit and the controller circuit, wherein a portion of the other interconnect is further coupled between the controller circuit and a cache memory.

15. The processor of claim 12, further comprising one or more other processor cores, wherein the pipeline circuit is further coupled to received respective data from each of the one or more other processor cores.

16. A method at a pipeline circuit for performing in-memory computations, the method comprising:
  receiving first data from a controller circuit coupled to the pipeline circuit, wherein the pipeline circuit comprises multiple stages arranged in an in-series configuration, the multiple stages comprising a first stage and a second stage;
  storing the first data at a first memory array of the first stage;
  performing at the first stage a first computation based on a read of the first data from the first memory array, wherein the first computation comprises a first operation on first operands which are each read from a respective addressable location of the first memory array;
  storing a first result of the first computation at the first memory array;
  communicating second data from the first stage to the second stage via a first interconnect of the pipeline circuit, wherein the second data is based on the first result, wherein any signal communication between the first interconnect and the controller circuit is to be via one or more stages of the multiple stages;
  storing the second data at a second memory array of the second stage;
  performing at the second stage a second computation based on a read of the second data from the second memory array, wherein the second computation comprises a second operation on second operands which are each read from a respective addressable location of the second memory array; and
  storing a second result of second computation at the second memory array.

17. The method of claim 16, wherein performing the first computation comprises automatically performing multiple accesses to the first memory array according to a sequence which is predefined at the first stage.

18. The method of claim 16, wherein communicating the second data comprises automatically communicating with the first stage and the second stage independent of any explicit command from the controller circuit to communicate the second data.

19. The method of claim 16, further comprising:
  at the first stage, receiving a feedback from a respective subsequent stage of the multiple stages; and
  based on the feedback, performing a next recursion of a recursive data processing with the pipeline circuit.

20. A system comprising
a pipeline circuit for performing an in-memory computation, the pipeline circuit comprising:
  a first stage of multiple stages of the pipeline circuit, the multiple stages arranged in an in-series configuration, the first stage comprising:
    a first interface to receive first data from a controller circuit coupled to the pipeline circuit;
    a first memory array to store the first data; and
    first circuitry coupled to the first memory array, the first circuitry to perform a first read of the first data from the first memory array, to perform a first computation based on the first read of the first data, and to store a first result of the first computation at the first memory array, wherein the first computation comprises a first operation on first operands which are each read from a respective addressable location of the first memory array;
  an interconnect coupled to receive from the first stage second data which is based on the first result, wherein any communication between the interconnect and the controller circuit is to be via one or more of the multiple stages;
  a second stage of the multiple stages, the second stage comprising:
    a second interface to receive the second data from the interconnect;
    a second memory array to store the second data; and
    second circuitry to perform a second read of the second data from the second memory array, to perform a second computation based on the second read of the second data, and to store a second result of the second computation at the second memory array, wherein the second computation comprises a second operation on second operands which are each read from a respective addressable location of the second memory array; and
  a display device coupled to the pipeline circuit, the display device to display an image based on a signal communicated with the pipeline circuit, the signal based on the second computation.

21. The system of claim 20, wherein the first circuitry to perform the first computation comprises the first circuitry to automatically perform multiple accesses to the first memory array according to a sequence which is predefined at the first stage.

22. The system of claim 20, wherein the first stage and the second stage are to automatically communicate the second data independent of any explicit command from the controller circuit to communicate the second data.

23. The system of claim 20, wherein the second stage is further to:
receive third data from the first stage; and
pass the third data through to a respective subsequent stage of the pipeline circuit, wherein any storage of the third data at a memory array is external to the second stage.

* * * * *